Figure 1:
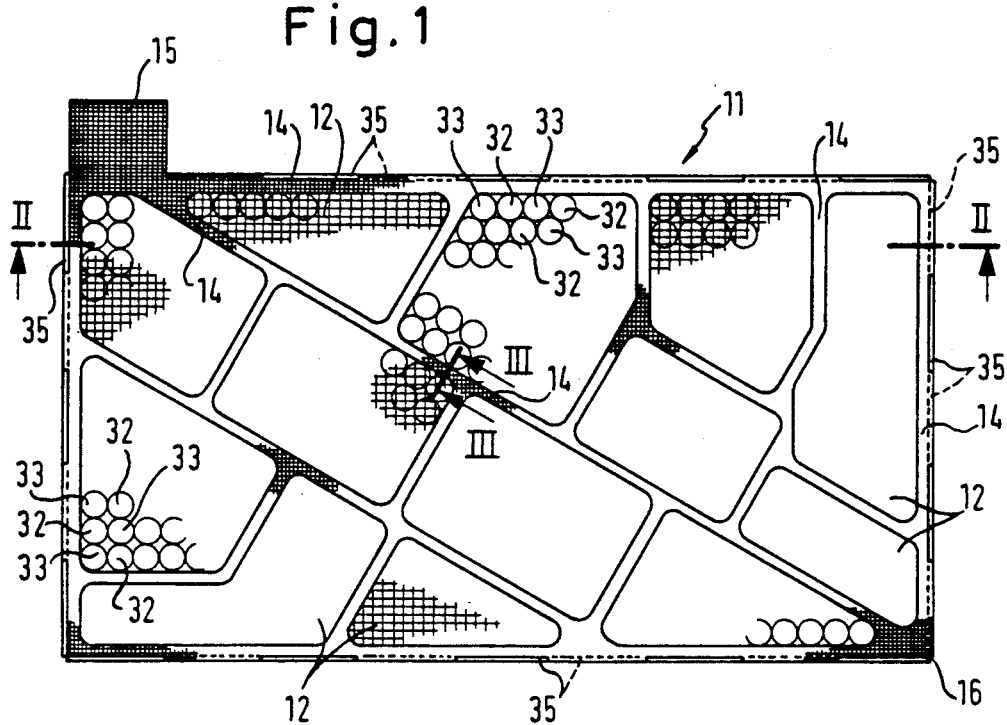

United States Patent [19]
Drews et al.

[11] Patent Number: 5,139,902
[45] Date of Patent: Aug. 18, 1992

[54] ELECTRODE FOR ELECTROCHEMICAL CELLS

[75] Inventors: Jürgen Drews, Soest; Karl Christoph Berger, Bad Sassendorf, both of Fed. Rep. of Germany

[73] Assignee: Hagen Batterie AG, Soest/Westf., Fed. Rep. of Germany

[21] Appl. No.: 549,325

[22] Filed: Jul. 6, 1990

[30] Foreign Application Priority Data

Jul. 7, 1989 [DE] Fed. Rep. of Germany ....... 3922424

[51] Int. Cl.$^5$ ............................................. H01M 4/74
[52] U.S. Cl. .................................. 429/234; 429/241; 429/245
[58] Field of Search ............... 429/234, 233, 241, 245, 429/209, 211

[56] References Cited

U.S. PATENT DOCUMENTS

| | | | |
|---|---|---|---|
| 3,247,023 | 4/1966 | Geissbauer | 429/234 X |
| 3,269,863 | 8/1966 | Helms | 429/234 |
| 3,516,864 | 6/1970 | Willmann | 429/234 X |
| 4,091,192 | 5/1978 | Scholle | 429/241 X |
| 4,476,206 | 10/1984 | Viala et al. | 429/234 |
| 4,487,792 | 12/1984 | Hartmann | 429/233 X |
| 4,717,633 | 1/1988 | Hauser | 429/209 |
| 4,749,635 | 6/1988 | Muller et al. | 429/245 X |
| 4,782,585 | 4/1988 | Kobayashi et al. | 29/623.5 |

Primary Examiner—Anthony Skapars
Attorney, Agent, or Firm—Townsend and Townsend

[57] ABSTRACT

A negative electrode for lead-acid storage batteries comprises a grid plate (11) serving as the carrier for the active material and for current supply and return. The grid plate (11) is a network of plastic threads produced by a weaving process which is rendered electrically conductive by coating it, with a highly conductive thin layer of metal and additionally metallized with at least one coating of a lead-tin alloy or of lead. The grid plate (11) is subdivided into storage zones (12) produced by deep-drawing for receiving the active material and into current conducting zones (14) for current supply and return.

22 Claims, 5 Drawing Sheets

ELECTRODE FOR ELECTROCHEMICAL CELLS

The invention relates to an electrode for electrochemical cells, particularly to a negative electrode for storage batteries, especially lead-acid storage batteries, comprising a grid plate serving as the carrier for the active mass and for current supply and return.

An electrochemical energy storage element, also termed an electrochemical cell, normally comprises three basic components, namely the active material, grids receiving and carrying the active material and an electrolyte provided between the grids. In addition, the positive and negative grids are generally separated from each other by separators.

The grid plate in the electrochemical cell serves both as the material carrier and to conduct the flow of electrons during charging and discharging reactions into the active material. The flow of electrons is given off during discharge to a consumer and applied during charging from a source of current to the active material via the grid plates.

It is already known to produce the grid plates, particularly for the negative electrodes of lead-acid storage batteries, of metal. The manufacture of the grid plates mainly takes place by the casting of lead or however also through the use of expanded copper metal which is subsequently coated with lead-tin alloys and/or lead (DE-OS 33 12 550).

One problem associated with conventional grid plates is that they are relatively heavy and that grid shapes are restricted by the casting process or by their manufacture in expanded copper metal.

To reduce the amount of lead in storage batteries one known method (DE-PS 27 16 131) is to use a plastic grid as the basic member of the grid plate, on which a fan-shaped formation of lead wires is arranged and connected to the plastic grid by heating, thus separating the functions of the carrier material for the active material and current conduction by using two different components of the grid plate which results in complicated production and poor efficiency. Another method (U.S. Pat. No. 3,607,412) produces a conventional flat-type plastic grid configuration which is coated with a spray of molten lead to make it conductive.

One general problem when using plastic grids as the grid plate is that an evenly distributed current conductivity is not adequately achieved even when metal coating is used; another problem is that the capacity to receive the active material is limited. In addition, the spacing of the active material from the conducting parts of the grid plate is often so large that efficiency is lacking. The mechanical holding of the active material is also unsatisfactory.

The object of the invention is thus to create an electrode of the first-mentioned kind which can be produced particularly cost-effectively, is of as little weight as possible, can be manufactured in a variety of even complicated shapes and exhibits a particularly good electrochemical efficiency whilst ensuring a good and electrically effective mounting of the active material.

For satisfying this object the invention starts from a grid plate in the form of a plastic network preferably comprising threads of plastic coated with a highly conductive, thin layer of metal, particularly of copper and provided with lobe-shaped indentations and/or projections preferably formed by deep drawing and distributed over its surface to form a three-dimensional structure, the spacing of the threads of plastic being enlarged in the region of the indentations and projections. Plastic networks of this kind which are particularly suitable for the purpose of the present invention are described in the joint patent application disclosed at the same time by the Applicant and the company HOECHST AG entitled "Electrodes for galvanic primary and secondary elements" (DE-OS 39 22 425).

For satisfying the aforementioned object provision is made in accordance with the present invention that the plastic network is coated with at least one further coating of a lead-tin alloy or lead and is subdivided into at least one storage zone for accommodating the active material and having a plurality of indentations and/or projections and into at least one current conducting zone in which the plastic network has a plane two-dimensional structure. For this purpose it is useful when the plastic network is two-dimensionally distorted in the storage zone at substantially all locations, preferably to the same degree, whilst it is undistorted in said current conducting zone. It is furthermore of advantage when in the storage zone only the plastic threads are coated with the lead-tin alloy or lead and the mesh openings remain free, whilst in the current conducting zones also the meshes, between the plastic threads is filled with the lead-tin alloy or lead. The gist of the invention is thus to be seen in configuring a network of plastic threads in an ideal manner as a negative electrode particularly for a lead-acid storage battery so that it is subdivided into storage zones having throughout a three-dimensional filigrane structure and serving primarily to receive the active material, and additionally for the supply and return of currents from and into the active material and into current conducting zones which are preferably suitably distributed between the storage zones and which are particularly suitable to conduct the current from the storage zones to the connecting lug or from the connecting lug to the storage zones with as little resistance as possible as a result of the close mesh and the shorter current paths. Due to the close mesh of the plastic network in the current conducting zones the mesh of the plastic network is here filled with lead-tin or lead which is important for the conduction of current with as little resistance as possible. On the other hand the mesh in the storage zones is preferably made so wide that here the plastic threads are only coated with lead-tin or lead, whilst the mesh itself remains free. By this means the active material is able to anchor itself firmly not only between the walls of the indentations or projections but also in the mesh which remains open thus making a large overall surface available for the transfer of current from the active material into the grid plate and vice-versa.

It is perhaps possible that even smaller undistorted zones remain between the distortions of the projections and indentations but these would hardly impair the anchoring and current handling of the active material.

Particularly good current conduction is achieved when the plastic threads comprise a plurality of relatively fluffy, interlaced, thin monofilaments particularly of a synthetic material, thus creating a large metal surface and thus a relative large cross-section for the current paths due to the monofilaments being coated with a highly conductive metal, particularly with copper. This also enables the molten lead/tin or lead to enter the cavities between the many monofilaments of the threads of plastic where this also contributes to creating as large a current-conducting metal cross-section as possible. In addition, the lead/tin or lead is particularly well anchored in the plastic network.

The plastic threads can be joined into a plastic network either by a weaving process or by other techniques. Furthermore, a plurality of threads each comprising many monofilaments can also be twisted or braided together, the highly conductive metal coating being applied after the plastic network including the indentations and/or projections have been completed.

The smaller the diameter of each monofilament used in the plastic threads and the more monofilaments are provided in each plastic thread, the greater the surface available for receiving the highly conductive metal coating and also for incorporating lead/tin or lead in the cavities.

Since plastics have a substantially lower specific weight than metals the grid plate according to the present invention has a particularly low weight.

In the same way, the current conducting and electrochemical properties are superior to those of conventional grid plates, because networks made up of plastic threads formed by a plurality of monofilaments can be made very fine thus providing a particularly large effective surface for application of the metal coatings. Since plastic networks can be bent or otherwise shaped in any way desired in a departure from the normal flat configuration, the grid plate according to the invention can be produced in any shape required and can, for instance, be formed as a roll.

Coating the plastic threads with a highly conductive thin layer of metal is preferably done by first depositing a metal film of copper, for instance, in a thickness of 0.5 to 2 μm with subsequent electrolytic metallization with copper until a metal coating of 1 to 200, particularly 5 to 100 and preferably 10 to 50 μm is achieved. The material which can be used to advantage for the plastic threads is polyester, the plastic network being best rendered dimensionally stable by means of thermoplastic or thermosetting resins. Phenolic and acrylic resins are particularly suitable for this purpose.

Advantageous embodiments of the electrode according to the invention are disclosed by claims 4 to 6.

The galvanic coating of the plastic network is of advantage because the plastic is subject to no heating which could melt or even decompose the plastic.

It is, however, also possible to dip the plastic network, which is already galvanically coated with a highly conductive metal, into a lead or lead-tin alloy melt bath according to claims 7, 8 as long as the dip times are kept sufficiently short. The highly conductive metal coating also acts to advantage in this respect as a heat conductor.

It is useful to subject the plastic network to a cleaning process when it is already coated with a highly conductive metal layer in accordance with claims 9 to 11 prior to applying further coatings. Using a cooled cleaning bath is particularly useful since this counteracts any excessive heating of the plastic network when subsequently coated in the melt bath.

Claims 12 to 17 define particularly preferred embodiments, it being especially important in this respect that the current conducting zones are distributed over the surface of the grid plate so that exceptionally low-resistance current supply and return paths are ensured from and to all storage zones.

Producing the electrode or resulting plate sets according to the invention can be rendered particularly cost-effective due to the features of claim 18.

Due to the use of a plastic network which can be formed by simple means as the grid plate, material holding ledges can be provided around the edges of the grid plate by means of which the active material located in the indentations or projections can be held in place both on the side, from beneath and from above to particular advantage.

Should the longitudinal current conducting zones as provided for by the invention exhibit an excessive resistance, the embodiment according to claim 20 can be used which increases the metallic cross-section of the current conducting zones, thus further reducing the resistance.

Claim 21 discloses the procedure for producing the electrodes in accordance with the invention in a continuous process in series production.

Figure 2:
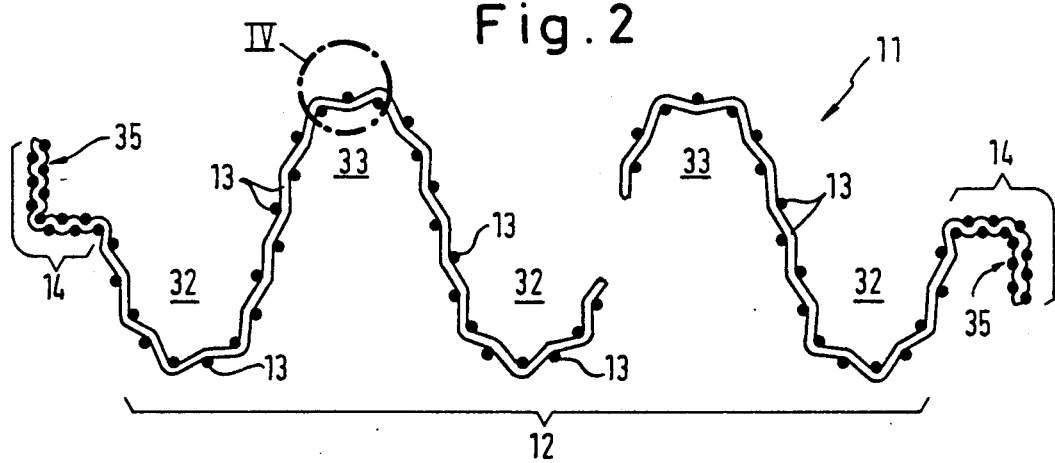
Figure 3:
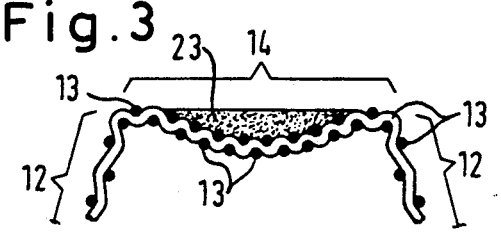
Figure 4:
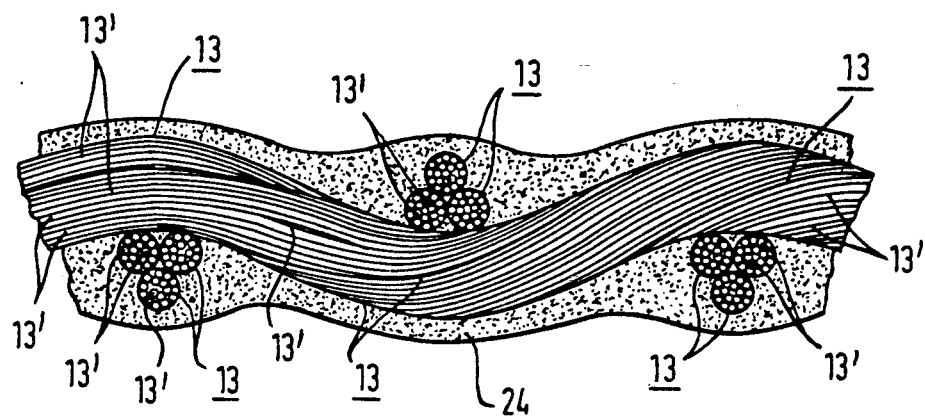
Figure 5:
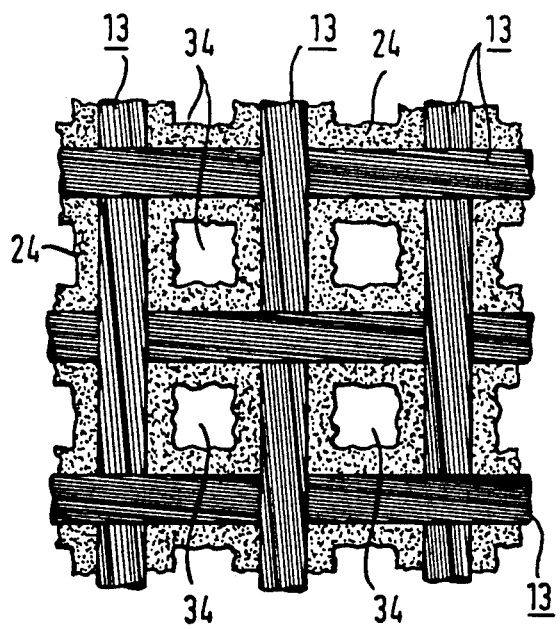
Figure 6:
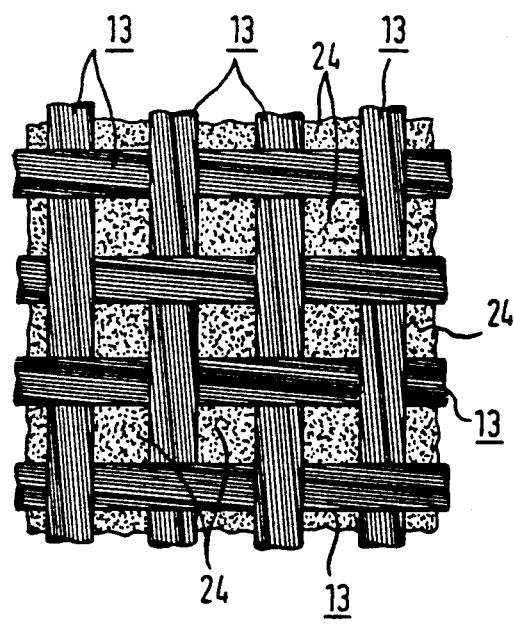
Figure 7:
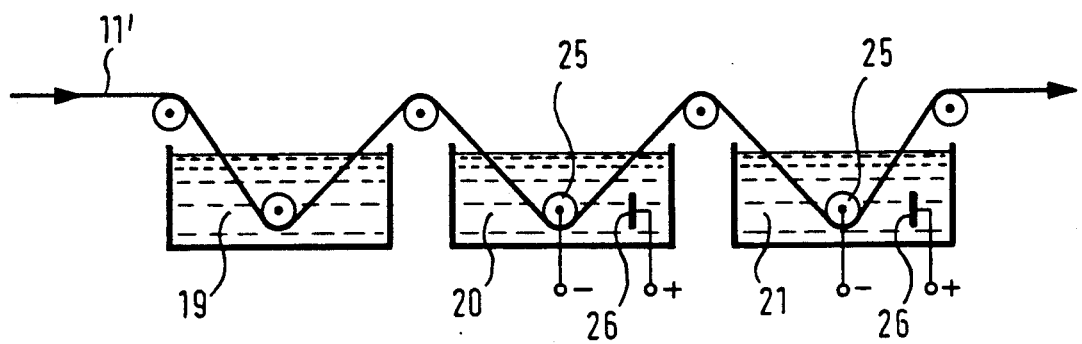
Figure 8:
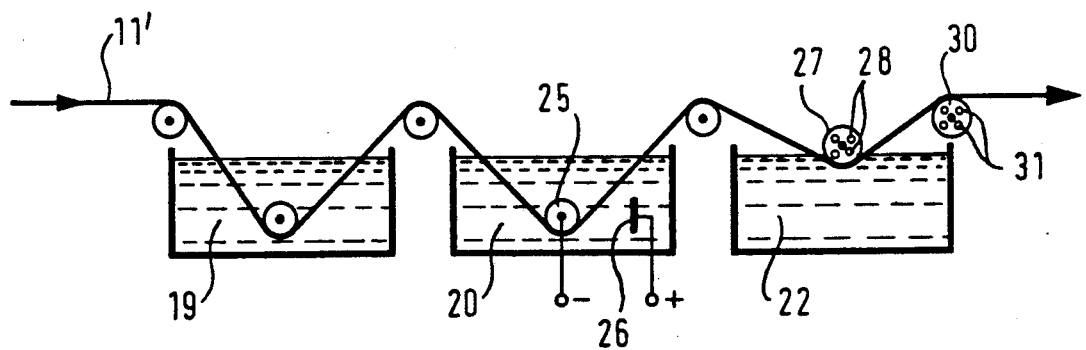
Figure 9:
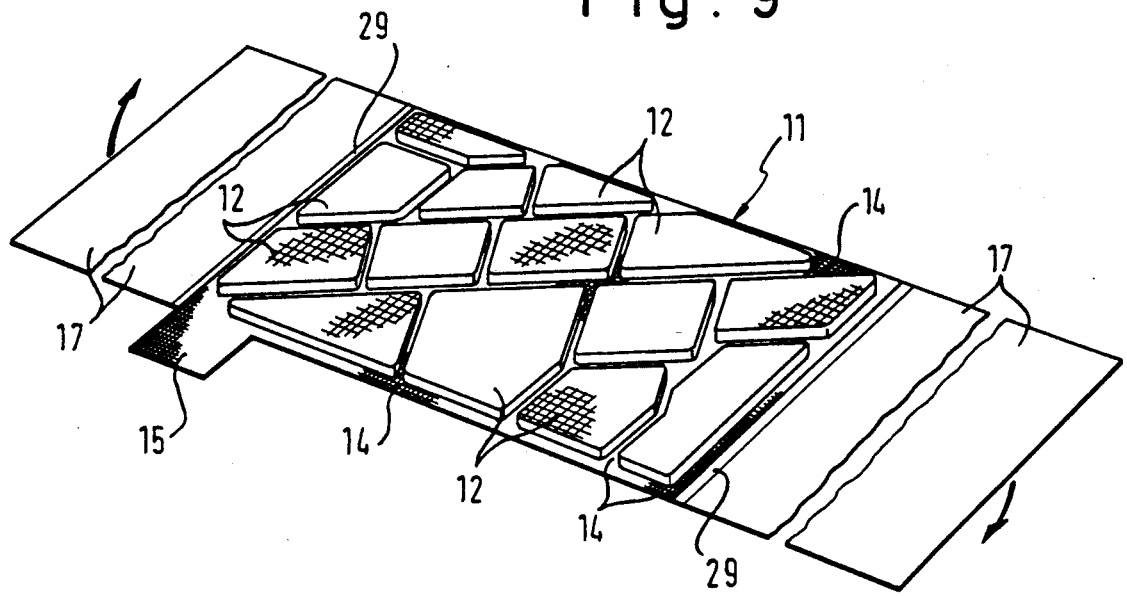
Figure 10:
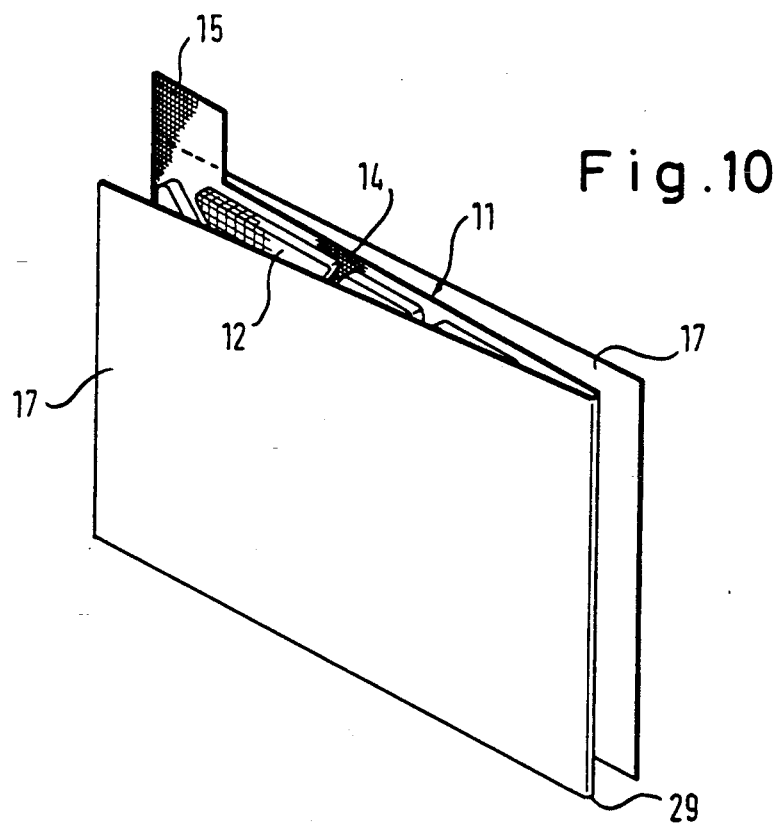
Figure 11:
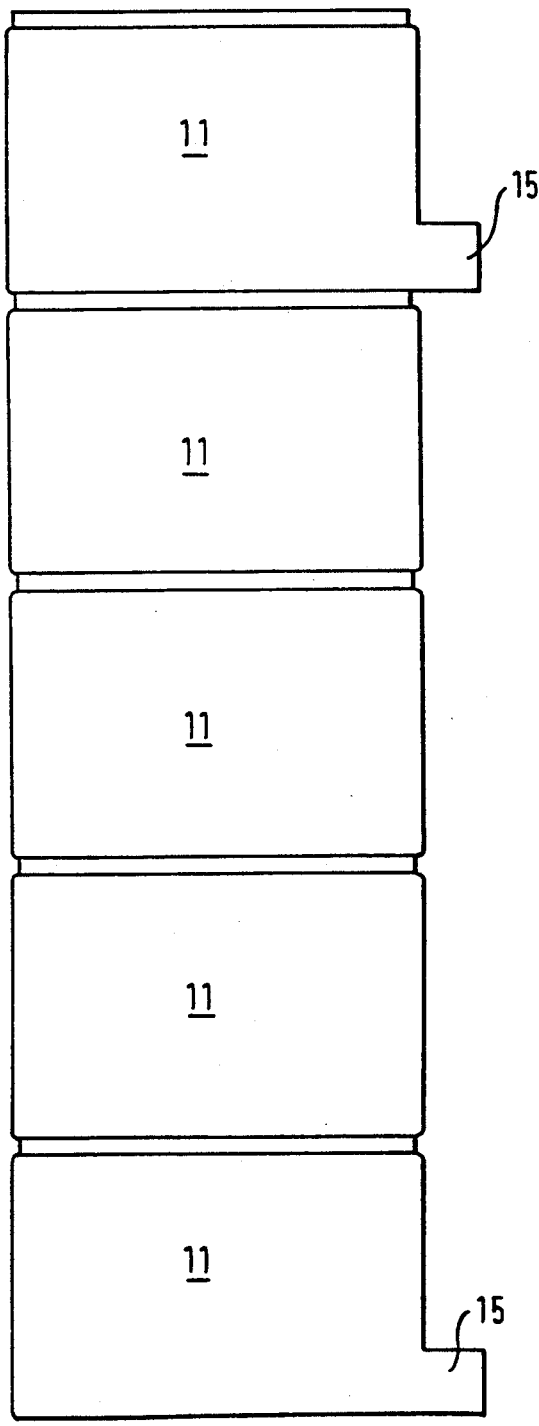
Figure 12:
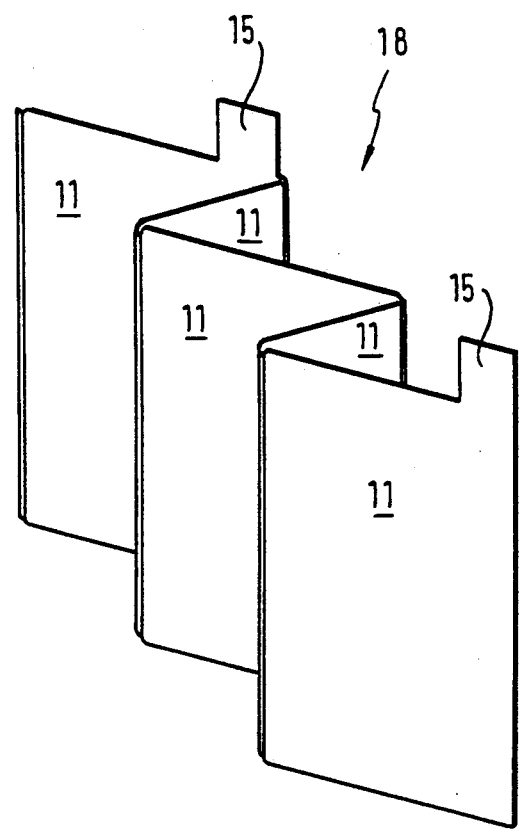

The invention will now be described by way of example with reference to the drawing in which FIG. 1 is a schematic plan view of the electrode according to the invention, FIG. 2 is an enlarged section along line II—II in FIG. 1 depicted schematically, FIG. 3 is an enlarged, schematic section along line III—III in FIG. 1 of an electrode featuring a fluted current conducting zone, FIG. 4 is an enlarged detail of zone IV in FIG. 2, FIG. 5 is an enlarged plan view of part of the electrode in the storage zone, FIG. 6 is a corresponding plan view in the current conducting zone, FIG. 7 is a device for producing an electrode according to the invention shown schematically, FIG. 8 is a further advantageous embodiment of the aforementioned production device, FIG. 9 is a perspective view of an electrode according to the invention in combination with separator plates, FIG. 10 is a schematic, perspective view of the combination according to FIG. 9 in the finished condition, FIG. 11 is a plan view of the electrodes in the form of a continuous band, and FIG. 12 is a perspective view of an electrode band formed into a plate set on the basis of FIG. 11.

According to FIGS. 1 to 6 a grid plate 11 according to the invention comprises a preferably woven or braided plastic network, the individual plastic thread 13 of which consist according to FIGS. 4 to 6 of a plurality of monofilaments 13', coated with a thin copper layer of a few μm thick. Numerous, for instance, three plastic threads (FIG. 4) can be connected together by braiding or twisting to form elongated combinations. It is useful to twist the entirety of the monofilaments 13' of a plastic thread 13. These plastic threads 13 are then coated with a lead or lead/tin alloy coating 24 (FIGS. 4, 5) in a thickness of 40 to 60 μm. It is useful for the coating 24 to penetrate the plastic threads 12 or at least into their surface so that the current transfer surface between coating 24 and the copper layers of the monofilaments 13' is as large as possible.

According to FIGS. 1 and 2 the grid plate 11 according to the invention features lobe-shaped indentations 32 and projections 33 formed to partly depart from the plane of the grid plate 11 alternately to one side and the other for example by deep-drawing the plastic network or the plastic threads 13, whereby 32 and 33 are shown greatly exaggerated and schematically in FIG. 2 and merely schematically as circles in FIG. 1; these form together the storage zones 12 for later receiving the active material. Between the storage zones and at the edge current conducting zones 14 are provided in the plane of the grid plate 11 and/or are bent upwards or downwards at 35 in accordance with FIGS. 1 and 2. In these current conducting zones the neighbouring plastic threads 13 are arranged so closely together that—as can be seen from FIG. 6—the mesh between the plastic threads 13 is so small that the lead-tin or lead coating 24 applied to the plastic threads 13 also fills the mesh of the plastic network.

Whereas the periodic and pointwise deformation of the plastic threads 13 or the plastic network out of the plane of the grid plate 11, particularly in accordance with FIG. 2, increases the electrical resistance, in accordance with the resultant lengthening of the plastic threads 13 and the creation of metal free interstices 34 in the mesh (FIG. 5), the electrical resistance in the current conducting zones 14 remains low, with the filling out of the meshes with lead-tin and/or lead contributing to the reduction of the resistance in the current conducting zones.

As result of the deep-drawing process for creating the indentations 32 or projections 33 the cavities or interstices 34 in these locations of the mesh (FIG. 5) are enlarged so that a lead coating 24 applied, for example, by dip-coating merely coats the plastic threads 13, but not the cavities 34. This promotes the firm mechanical anchoring of the active material later applied to the plastic network. For the good anchoring of the active material the indentations 32 and the projections 33 themselves are also responsible by holding the material practically on all sides with the exception of the side facing away from the plane of the plate. The width of the projections 33 and of the indentations 32 is in the region of 3 to 10 mm, particularly 4 to 6 mm. The depth of the projections 33 and of the indentations 32 amounts to 1 to 5 mm, particularly 2 to 3 mm. The ratio of width to depth should be in the region of 2 to 1 to 3 to 1, and thus the depth of the projections 33 and of the indentations 32 in FIG. 2 is represented exaggeratedly for reasons of clearly representing the concept of the invention. It is particularly important that the neighbouring projections 33 and indentations 32 directly interface so that the plastic network is two-dimensionally distorted also in the bordering areas of neighbouring projections 33 and indentations 32 and the enlarged cavities 34 are also present there. Alternating projections 33 and indentations 32 distorted in opposing directions creates a grid plate 11 which is particularly suitable for receiving large amounts of active material, for exceptionally good anchorage of the active material and for short paths conducting the current from and into the active material respectively.

Bending the edges of the grid plate at 35 as shown in FIGS. 1 and 2 and indeed alternately from one side to the other also makes for good anchorage of the active material applied later by the edge of the grid plate 11.

The storage zones 12 each comprise a large number of projections 33 and indentations 32 in the immediate vicinity of each other between which preferably no two-dimensional current conducting zones are provided. These current conducting zones 14 are provided, instead merely at a few or at all boundaries of the storage zones 12. All current conducting zones 14 are thus directly interrelated so that from any point of a current conducting zone 14 at least one current path containing merely further current conducting zones 14 leads to the connecting lug 15.

As can be seen from FIG. 1 the storage zones 12 are arranged with as large an area as possible as islands within the relatively slim current conducting zones 14 so that respective slim path-shaped current conducting zones 14 are provided between the individual current conducting zones 14, and are connected together in such a way that a satisfactory and low-resistance flow of current is ensured to and from the connecting lug 15 respectively. In their entirety the storage zones 12 and the current conducting zones 14 are distributed over the surface area of the grid plate 11 so that for one thing, the storage capacity for the active material is assured as large as possible and, for another thing, an adequate number of low-resistance current conducting paths lead from each of the storage zones 12 to the connecting lug 15 which are also configured flat, i.e. as a current conducting zone.

When the connecting lug 15 as shown in FIG. 1 is arranged in one corner of the grid plate 11 a straight-line, diagonally oriented current conducting zone 14 should lead to the diagonally opposed corner 16. Such an arrangement is also of advantage when the connecting lug 15 is displaced slightly more to the middle of the grid plate 11.

As shown in FIG. 3 path type the current conducting zones 14 can be formed fluted or channel-shaped and for example cast out, with lead 23, thus increasing the current conductivity in these zones. Instead of casting out the channel 14 with lead it can also be filled with the active material accordingly.

In accordance with FIG. 7 the electrode plate can be produced cost-effectively according to the invention by continuously passing an already deformed and copper-coated plastic network 11' in the form of a band through a cleaning bath 19, a galvanic lead-tin alloy bath 20 and a galvanic lead bath 21 respectively. In this arrangement the band 11' is negatively charged via electrically conducting deflection rollers 25 having a negative potential. Metallization of the band 11' with a lead-tin alloy in bath 20 and with lead in bath 21 is thus assured by the negative potential acting in conjunction with the positive potential of an electrode 26 incorporated in the baths. The band emerging from the galvanic lead bath 21 is thus provided with a copper coating, a lead-tin alloy coating and a lead coating.

As shown in FIG. 8 the already copper-coated band 11' which also already features the storage zones 12 and the current conducting zones 14 is first passed through the cleaning bath 19 before passing through the galvanic lead-tin alloy bath 20 and a lead melt 22. The heat-resistant transport rolls 27 arranged in the melt are located relatively near to the surface of the lead melt 22 so that the band 11' is dipped in the lead melt 22 only very briefly, thus preventing melting or even destruction of the plastic threads of the plastic network 11'.

To prevent the band 11' from being overheated in the lead melt 22 the deflection roller 27 can also be cooled according to the invention, e.g. by forcing a cooling fluid through axial cooling channels 28 in the transport roll 27 for instance, as shown schematically.

It is also useful to provide cooling of the grid plate 11 or the band 11' immediately on leaving the melt bath. This can be done, for instance, as shown in FIG. 8 by using a cooling roll 30 featuring cooling channels 31 for transporting the band 11'.

Galvanic precoating the network as shown in FIGS. 7 and 8 is not a mandatory requirement after cleaning. Production can be rendered more cost-effective and quicker by briefly dipping the grid plate 11 or band 11' in the lead melt 22 (see FIG. 8) immediately after cleaning.

Lead-coating of the grid plate (in the melt bath) without damaging the plastic material requires suitable adjustment of the lead temperature, the dwell time and the subsequent cooling rate.

As shown in FIG. 9 the grid plate 11 can be provided with two equally-sized separator plates 17 via two folding hinges 29 which in practice consist of the same plastic network as the grid plate 11 but are not metal coated. To ensure adequate thickness for the separator plates 17 the latter can be deformed in their entirety in similar manner to the grid plate 11 in the storage zones 12.

By folding the two separator plates 17 at the folding hinges 29 in the direction of the arrow as shown in FIG. 9 the arrangement can be brought into the configuration depicted by FIG. 10 so that with one and the same plastic network an overall configuration comprising a grid plate 11 forming the negative electrode and two separator plates 27 arranged on opposite sides of the grid plate 11 is possible. It would also be possible to produce a folded 'pocket' from separator plates and to insert therein a grid plate 11 produced separately.

According to FIG. 11 the production method as depicted in FIGS. 7 and 8 can be used, for example, to produce a plurality of the grid plates 11 according to the invention in the form of a band as a single piece. Following production several of the band-like interconnected grid plates 11 are then cut out and folded into the plate set 18 as shown in FIG. 12. In this arrangement the individual plates are conductively connected to each other at the hinges so that connector lugs 15 are necessary only at one end or at both ends.

It is important that preparation of the grid plate for use in a storage battery by coating it with lead-tin or lead is first done when the polymer network structure is available with the current conducting zones 14 and the storage zones 12 preformed and already metallized with copper.

The geometric grid structure is no longer restricted by technical casting constraints or by the prescribed shapes of metals for extruding when applying the method according to the invention. The method of the invention permits the production of structures formerly not possible.

Anchoring the active material to the grid plates is a known problem in the production of electrodes for storage batteries. The properties of the electrodes according to the invention as aforementioned are improved in this respect to the extent that the contact surface area between the grid and the active material is considerably larger by the invention using a large number of thin grid elements formed by the plastic threads or fibers instead of a few thicker elements as in conventional grids. Since the grid elements formed by the plastic threads, and particularly the monofilaments contained therein, are coated with copper this also contributes to promoting the electrical conductivity. In addition, the exploitation of the active material is substantially improved by the electrode according to the invention.

The advantages afforded by the electrode according to the invention are governed, among other things, by the close basic mesh of the grid structure typical for the plastic networks which in the area of the indentations 32 and of the projections 33 is greatly enlarged.

Instead of an aqueous solution of citric acid the cleaning bath can also comprise aqueous solutions of other hydroxycarbonic acids. The dip time in the cleaning bath expediently lies between 2 and 10 sec.

After cleaning any remaining traces of the cleaning bath solution adhering to the grid plate should be removed by means of compressed air. Completely removing all traces of the cleaning bath solution before coating with lead-tin or lead is particularly important to ensure a complete, uninterrupted metallization in the subsequent step of the process.

Should a relatively brittle active material be used the indentations 32 and projections 33 can be made narrower than when using a more viscous material.

The active material can be applied, to the electrode of the invention from both sides, for example by means of rollers, it being important to ensure that the material is distributed evenly over all indentations and projections as well as in the fluting channels of the current conducting zones when configured as such. Lewelling and compacting the active material can be done by subjecting it to ultrasonic radiation resulting in the material being rendered more fluid, thus improving the flow behaviour. When the material has relatively little viscosity and/or is subjected to ultrasonic radiation application can also be made on one side, the material then oozing through the meshes of the storage zones to the other side.

All materials which can be produced in the consistency of a paste or cream are suitable for the active material. Particularly in the production of electrodes for lead-acid storage batteries the base material can have a density in the range of 3 to 5.7 g/ml can be applied either manually or by machine. To improve distribution of the material it is possible to use ultrasonic radiation for the intermediate liquefaction of the material.

Double-sided pasting is of advantage, particularly in dense networks, to achieve complete envelopment of all parts of the network. In addition, total envelopment of a dense network can be achieved by using thinner blends and subsequent squeezing with a suction felt material which is later used in the finished cell as an acid reservoir.

The projections 33 and indentations 32 can be differently shaped depending on the particular application, e.g. they can take the shape of cones or truncated cones, pyramids or truncated pyramids having a differing polygonal bases, cylinders, prisms, spherical segments etc. It is also particularly useful when the tops of all projections all lie in a single plane and parallel to the base surface, the same applying in the same sense to the indentations.

What is claimed is:

1. An electrode for electrochemical cells comprising a grid plate (11, 11') having threads coated with a conductive material and configured in a network, the network having a plurality of indentations formed by deep-drawing and a plurality of mesh openings, the mesh openings being relatively larger in the region of the indentations, the network being coated with a further coating of at least one of a lead-tin alloy and lead and having at least one storage zone and at least one current conducting zone, the at least one storage zone being configured to receive an active material and having the plurality of indentations (32), the at least one current conducting zone having a plane, two-dimensional structure.

2. An electrode according to claim 1, wherein said network is two-dimensionally deformed in the at least one storage zone whereas the network is not substantially deformed in the at least one current conducting zone (14).

3. An electrode according to claim 1, wherein the mesh openings in the at least one storage zone remain substantially free of the further coating, whereas the mesh openings in the at least one current conducting zone are substantially filled with the further coating.

4. An electrode according to claim 1, wherein the further coating comprises a
lead-tin alloy having a lead content in the range of 20 to 90% and a thickness in the range of about 5 to 150 μm.

5. An electrode according to claim 3, wherein the network further comprises a lead coating having a thickness in the range of about 30 to 70 μm.

6. An electrode according to claim 1, wherein the further coating is applied galvanically.

7. An electrode according to claim 1, wherein the further coating is applied by dipping the network in a bath for a dip time, the dip time being selected such that the threads and conductive material do not melt.

8. An electrode according to claim 7, wherein the temperature of the melt bath is in the range of 400° to 700° K., and the dip time is about 1 to 4 sec.

9. An electrode according to claim 1, wherein the grid plate is dipped in a cleaning bath for a clean dip time prior to applying the further coating, the clean bath comprising citric acid.

10. An electrode according to claim 9, wherein the clean dip time is in the range of about 2 to 10 sec.

11. An electrode according to claim 9, wherein the cleaning bath has a temperature in the range of about 250° to 350° K.

12. An electrode according to claim 1, wherein the further coating is applied after forming the indentations.

13. An electrode according to claim 1, wherein at least one current conducting zone (14) is provided on a current extracting side of the grid plate.

14. An electrode according to claim 13, wherein the grid plate further comprises a connecting lug configured to be a current conducting zone (14).

15. An electrode according to claim 13, wherein the grid plate further comprises a rim configured to be a current conducting zone (14).

16. An electrode according to claim 1, wherein a plurality of current conducting zones (14) extend in a street-like manner between a plurality of storage zones (12).

17. An electrode according to claim 1, wherein a diagonal current conducting zone (14) runs from a connecting lug located in a corner of the grid plate to a diagonally opposed corner (16).

18. An electrode according to claim 1, wherein a plurality of grid plates (11) is formed as a continuous band (18) and folded together to produce a set of grid plates (18).

19. An electrode according to claim 1, wherein the network has a material holding flange (35) bent at a right angle to the plane of the plate and bent further in the plane of the grid plate, said flange protruding roughly the same distance from the plane of the plate as the indentations.

20. An electrode according to claim 1, wherein the at least one current conducting zone comprises a groove lying substantially in the direction of current flow, the groove being at least partly cast out with the further coating or the active material.

21. An electrode according to claim 1, wherein the grid plate comprises a plurality of storage zones (12) separated by a plurality of current conducting zones, the current conducting zones being connected together.

22. An electrode for electrochemical cells comprising a grid plate having threads coated with a conductive material and configured in a network, the network defining indentations and projections formed by deep-drawing and a plurality of mesh openings, the mesh openings being relatively larger in the region of the indentations, the network being coated with a further coating of at least one of a lead-tin alloy and lead and forming at least one storage zone and at least one current conducting zone being free of indentations and projections so that it has a plane, two-dimensional structure, the at least one storage zone being configured to receive an active material and having a plurality of indentations and projections.

* * * * *